Figure 2:
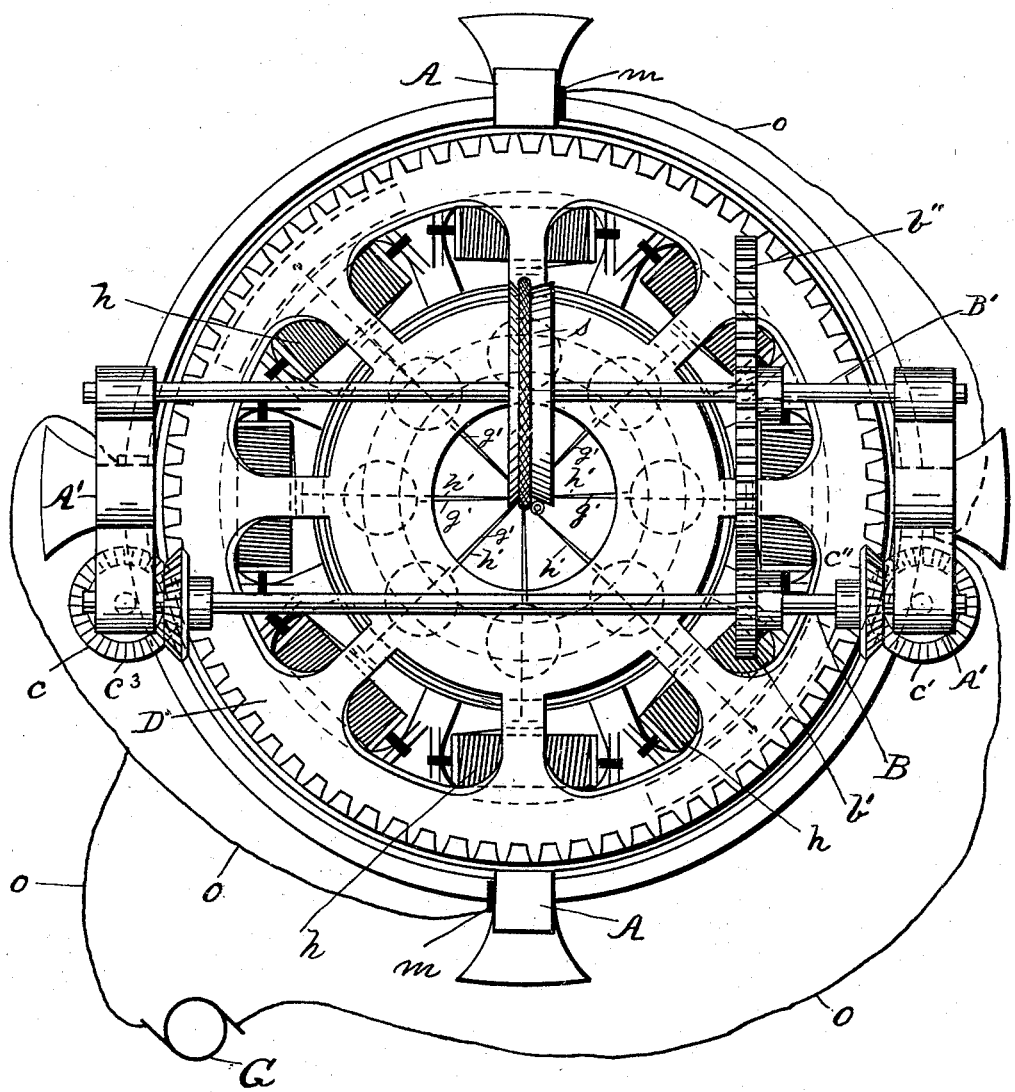

(No Model.) 6 Sheets—Sheet 1.
A. C. SHUTTLEWORTH.
ELECTROMAGNETIC BRAIDING MACHINE.
No. 591,105. Patented Oct. 5, 1897.
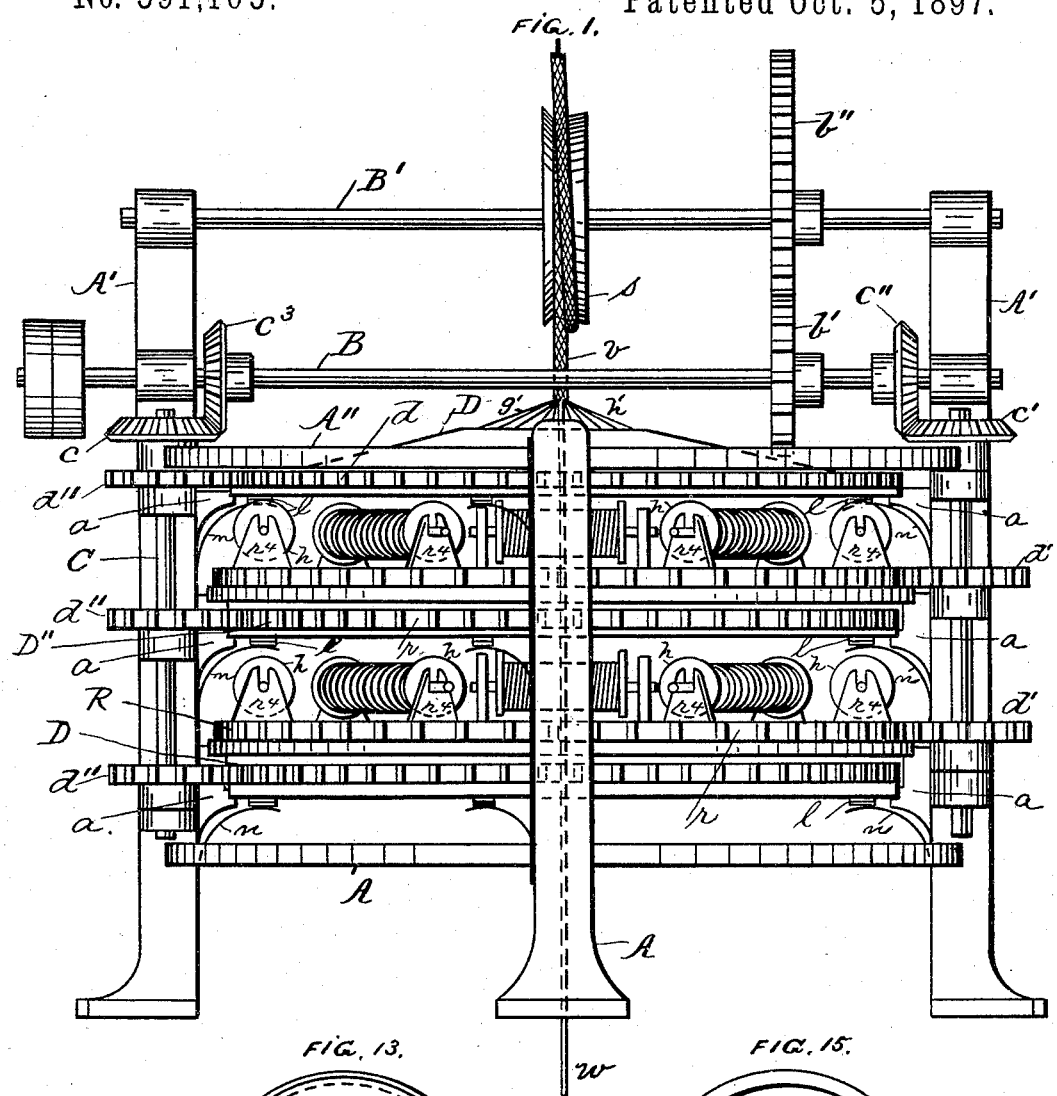
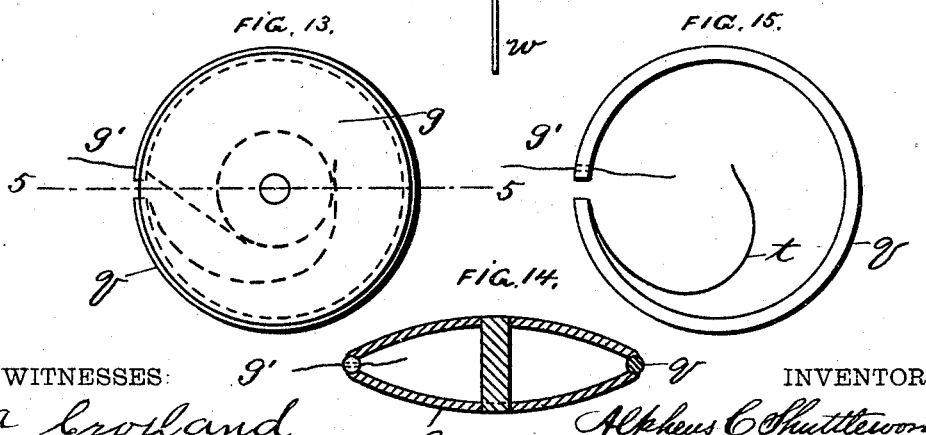
WITNESSES: a Crowland, Frank B. Linzey
INVENTOR Alpheus C. Shuttleworth
by Lewis F. Brous, atty (No Model.) 6 Sheets—Sheet 2.

A. C. SHUTTLEWORTH.
ELECTROMAGNETIC BRAIDING MACHINE.

No. 591,105. Patented Oct. 5, 1897.

WITNESSES
a Crosland
Frank B. Lizey

INVENTOR
Alpheus C Shuttleworth
by Lewis F Brous
Atty (No Model.) 6 Sheets—Sheet 3.
A. C. SHUTTLEWORTH.
ELECTROMAGNETIC BRAIDING MACHINE.
No. 591,105. Patented Oct. 5, 1897.
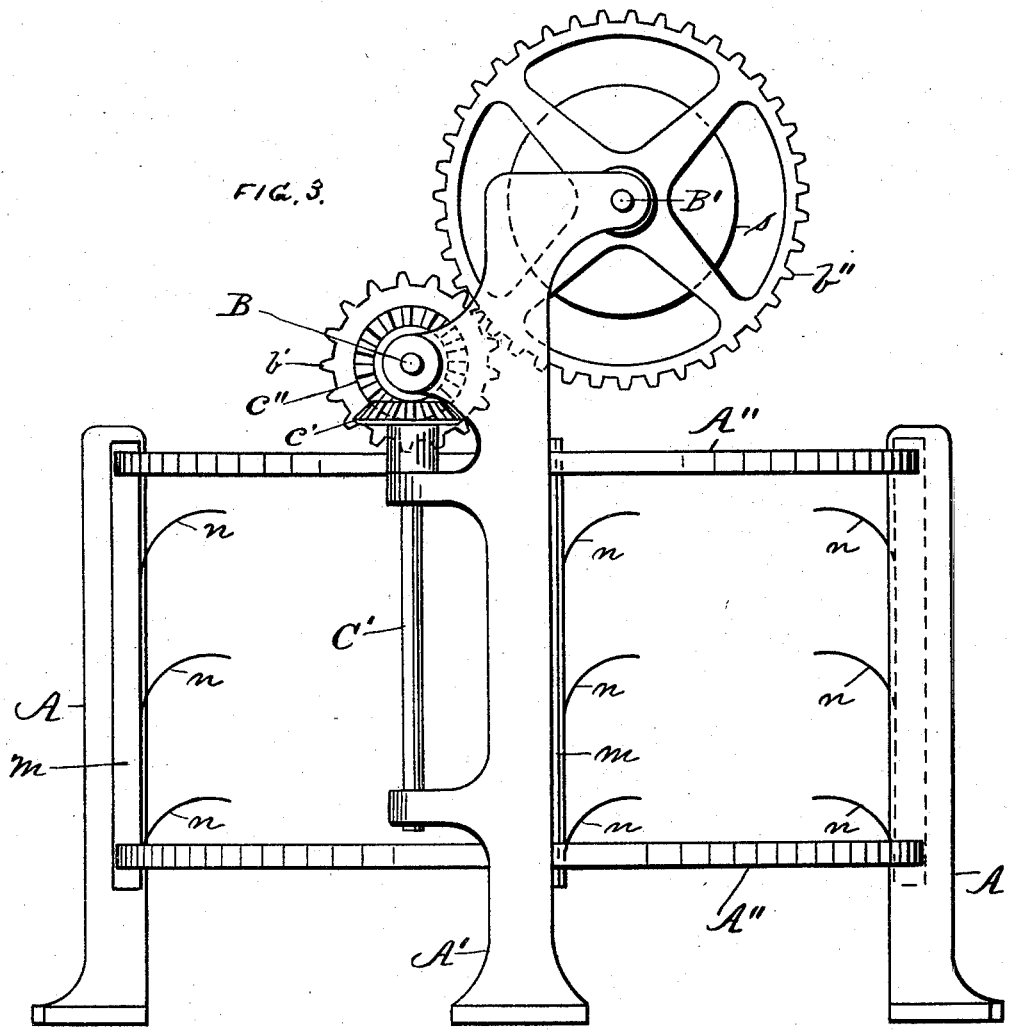
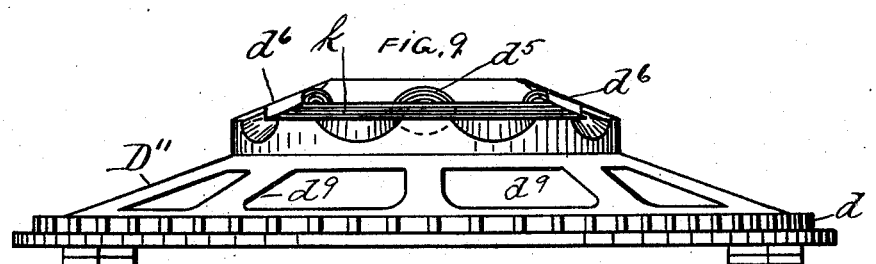
WITNESSES: INVENTOR
a. Crosland Alpheus C. Shuttleworth
Frank B. Lizzey by Lewis F. Brous
Atty (No Model.)  6 Sheets—Sheet 4.

A. C. SHUTTLEWORTH.
ELECTROMAGNETIC BRAIDING MACHINE.

No. 591,105. Patented Oct. 5, 1897.

WITNESSES:
a Crosland
Frank B. Livzey

INVENTOR.
Alpheus C. Shuttleworth.
By Lewis F. Brous
Atty.

(No Model.) 6 Sheets—Sheet 5.

A. C. SHUTTLEWORTH.
ELECTROMAGNETIC BRAIDING MACHINE.

No. 591,105. Patented Oct. 5, 1897.

WITNESSES: INVENTOR (No Model.) 6 Sheets—Sheet 6.
A. C. SHUTTLEWORTH.
ELECTROMAGNETIC BRAIDING MACHINE.
No. 591,105. Patented Oct. 5, 1897.
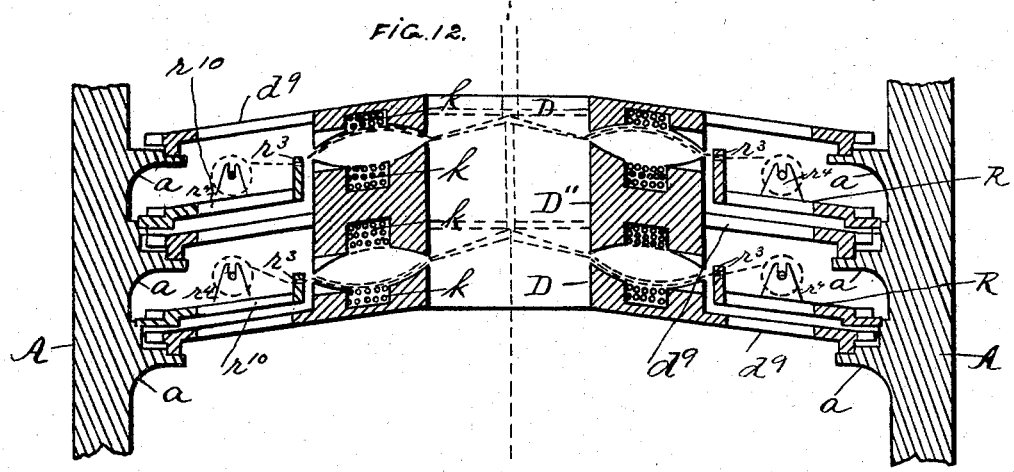
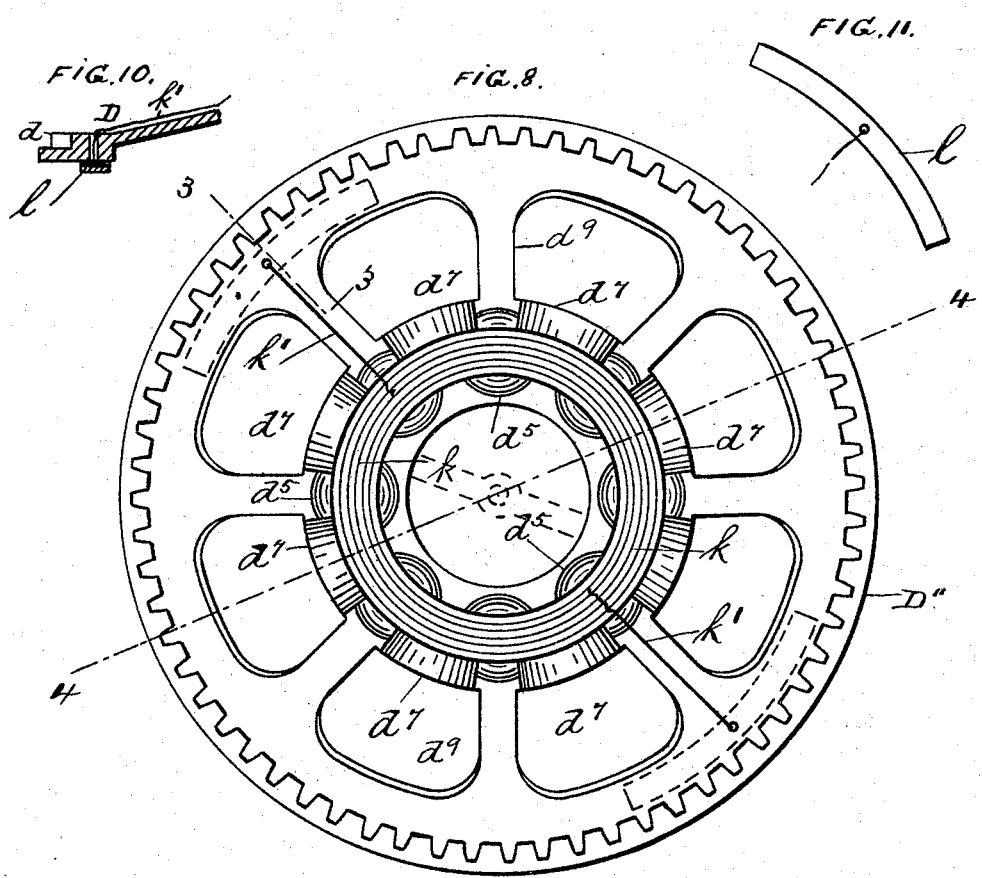
WITNESSES:
a Croland
Frank B. Lizzey
INVENTOR
Alpheus C Shuttleworth
by Lewis F Brous.
Atty

UNITED STATES PATENT OFFICE.

ALPHEUS C. SHUTTLEWORTH, OF PHILADELPHIA, PENNSYLVANIA, ASSIGNOR TO HUGH M. QUINN, PHILIP R. WELLS, HOWARD A. ENGLE, AND W. HOWARD HOLDEN, OF SAME PLACE.

ELECTROMAGNETIC BRAIDING-MACHINE.

SPECIFICATION forming part of Letters Patent No. 591,105, dated October 5, 1897.

Application filed March 2, 1896. Serial No. 581,490. (No model.)

*To all whom it may concern:*

Be it known that I, ALPHEUS C. SHUTTLEWORTH, a citizen of the United States, residing at Philadelphia, (Frankford,) in the county of Philadelphia and State of Pennsylvania, have invented certain new and useful Improvements in Electromagnetic Braiding-Machines; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention, hereinafter fully described, reference being had by letters to the drawings herewith, is of the character used in the manufacture of woven tubular fabrics and for the covering of wire by interwoven or crossing strands.

The principal object sought to be accomplished in a weaving-machine of this kind, but better known as a "braiding-machine," is the alternate crossing and spiral winding of the threads, thereby causing the latter to interlap and form a tubular web as the weaving continues, and to do this in a uniform manner and at a rapid speed. Each of the threads comprising the weave are made to pass over and under each alternate thread, so that the thread selected to pass over a certain thread will pass over the same thread each time it meets it in its directly opposite movement.

In order to properly braid the threads on this machine and insure the production of a perfect fabric, it is essential that the number of threads employed be divisible by two, so that the sets of threads shall pass each other during the braiding operation at the proper intervals.

The machines at present employed for the manufacture of braids or similar forms of weave, while not only very expensive to construct and extremely intricate in number of parts, are not capable of being run at any high rate of speed in order to manufacture rapidly fabric or covering of the classes mentioned.

The form of machine most in use at present employs vertical bobbins mounted upon peculiarly-constructed carriages that are made to traverse in directly opposite directions a tortuous slot or passage-way between stationary plates by means of a train of gear-wheels concentric with the weave, and each separate gear is provided with wings or projections that engage the stem of the bobbin-carriage and by means of the slot or tortuous passage-way propels the bobbin-carriages past each alternate bobbin. It will be readily understood that by using such a train of gear-wheels, aside from the friction of the bobbin-carriages in the slot, it will require a great expenditure of power to drive such a machine, and it is also at once apparent that but an exceedingly slow rotary motion of the two directly oppositely moving set of bobbin-carriages can be attained.

Other machines have also been designed to overcome these defects, but as far as I am able to learn intricate construction and the use of multiplex devices more or less liable to get out of order have not to any appreciable extent remedied the troubles aside from being very expensive to build, so that any and all of the machines as now constructed and used have their faults, and, as before stated, the most important of which is the low speed at which they can be run and their limited amount of product.

In my invention cheapness of construction, simplicity of parts, and speed are its principal advantages, while by the use of the agency of magnetism the operations of the machine are positive and automatic, while little, if any, attention is required on the part of the operator.

I shall now proceed to describe the various views of the machine and its parts on the several sheets of the accompanying drawings, and shall hereinafter refer to them by reference-letters in describing the construction and operation of the machine.

Figure 4:
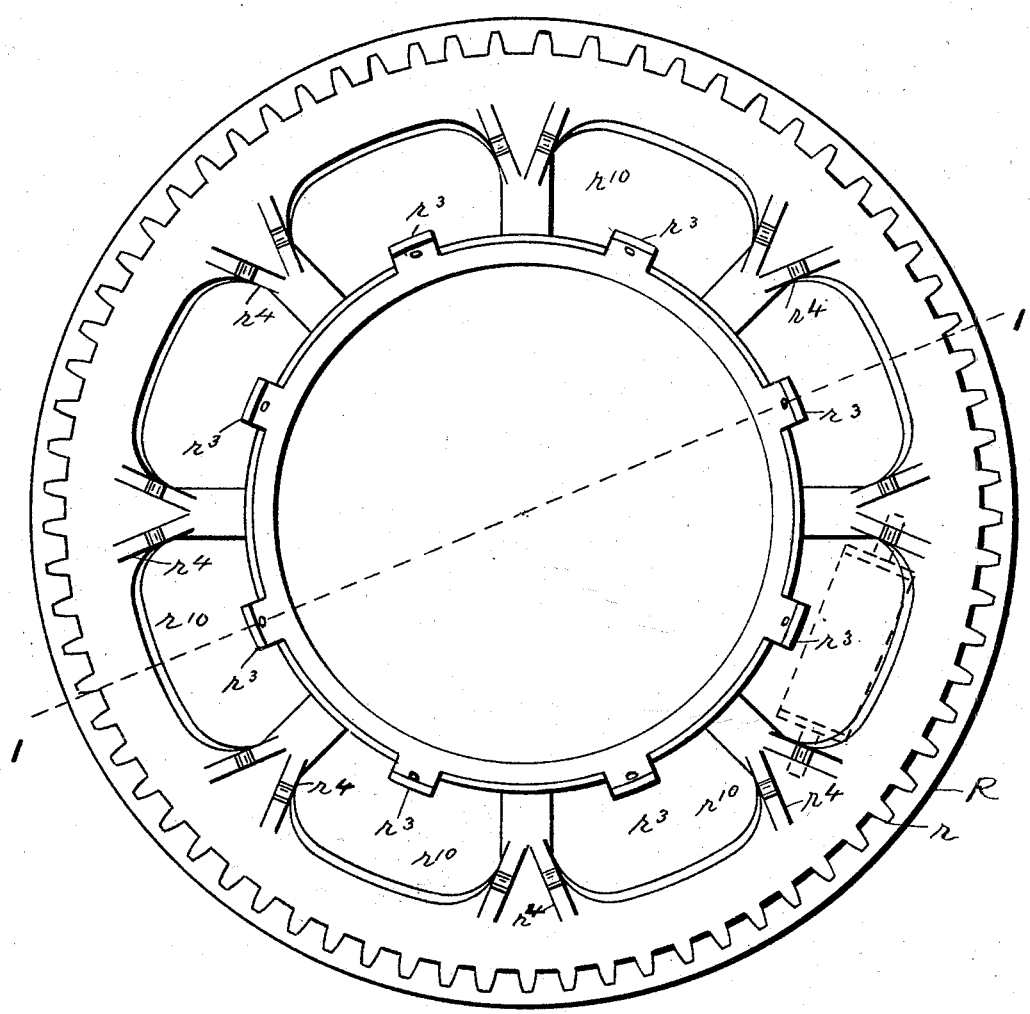
Figure 5:
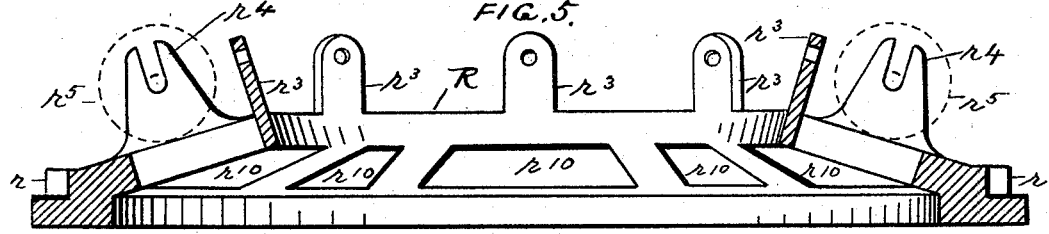
Figure 6:
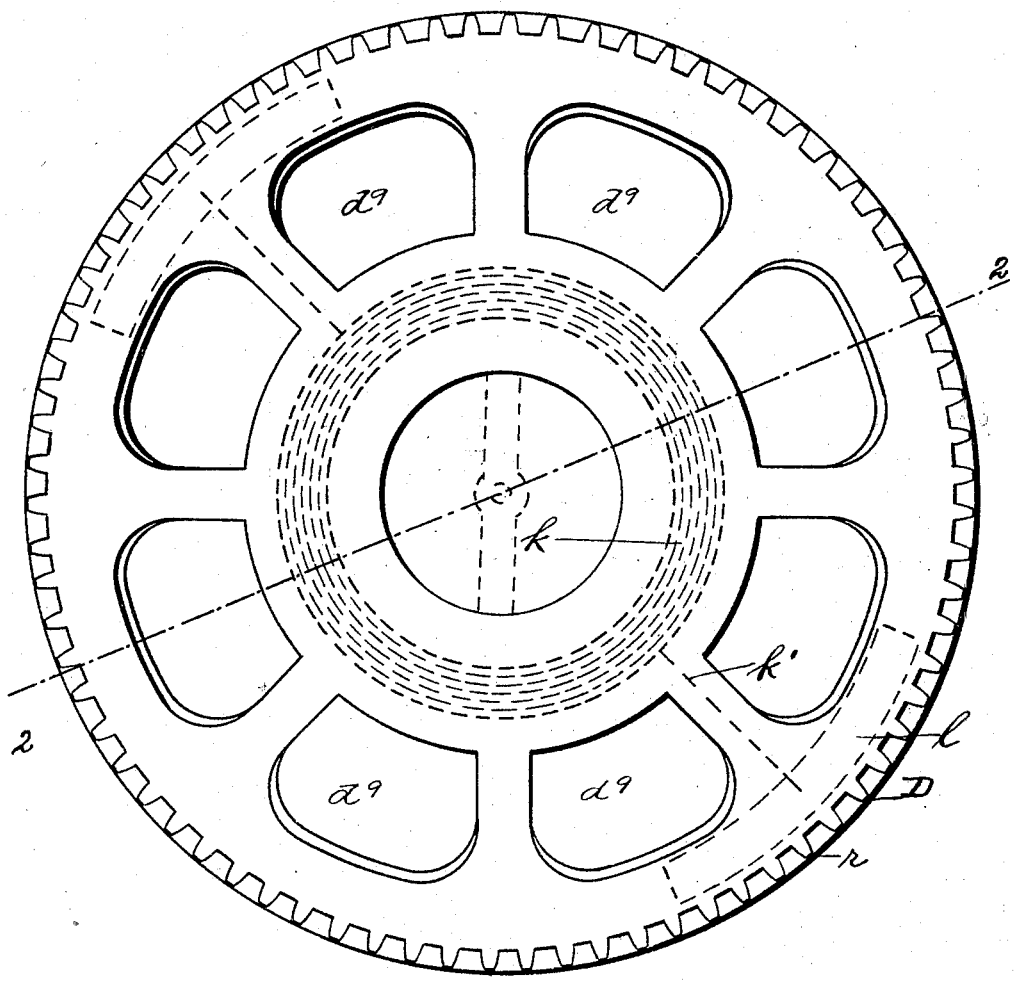
Figure 7:
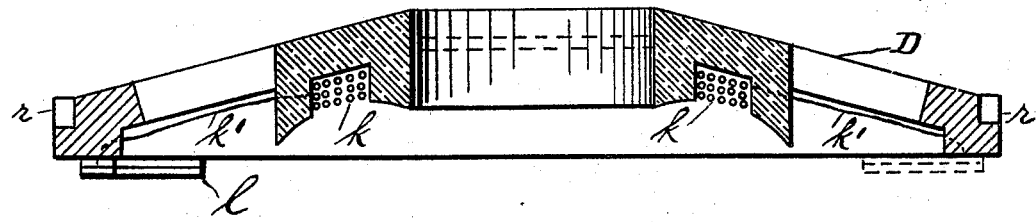

Figure 1 is a front elevation of the machine, showing the several rotating parts mounted in the framework. Fig. 2 is a top or plan view of the same, also showing the connections between the contact-plates and the source of electrical supply. Fig. 3 is a view of the side of the machine, illustrating the shape of the two directly opposite standards comprised in the framework supporting all the parts, journaled in the top of which standards is the drive-shaft and the shaft carrying the drag-wheel for the manufactured product, together with the insulated contact-plates and contact-springs on the several standards of the frame. Fig. 4 is a top view of one of the non-magnetic toothed shells carrying the bobbins whose axes are in a horizontal plane. Fig. 5 is a section of same on line 1 1. Fig. 6 is a top view of the upper toothed magnetic plate or shell which controls the shuttles. Fig. 7 is a transverse section of this plate at 2 2. Fig. 8 is a top view of an intermediate toothed circular and magnetic shell for controlling the shuttles having two magnetic faces. Fig. 9 is an edge view of the same toothed shell. Fig. 10 is a short section at 3 3 through the rim of the double-faced magnetic shell. Fig. 11 is a face view of one of the contact-plates secured to the under side of the magnetic shells. Fig. 12 is a vertical section at 4 4 of all of the toothed circular shells when assembled in the machine, showing the position (in dotted lines) of the bobbins and shuttles and the direction of their respective threads. Fig. 13 is an enlarged top view of one of the shuttles which is magnetically acted upon. Fig. 14 is a section of same at 5 5. Fig. 15 is a detached view of the circular guide-spring loosely inclosed and resting in the rim of the shuttle, showing the tension-spring for the yarn.

Similar letters refer to like parts.

In the drawings, A A' A A' represent the four vertical standards or uprights comprised in the frame of the machine, A' A' giving support to the power-shafts B and B', and the latter is revolved by means of the meshing gears $b'$ and $b''$, the circular bands A'' joining the four standards of the machine, thereby producing a rigid and substantial framework.

Within the standards of the machine and resting upon suitable integral projections forming bearings $a$ one above the other, so as to form a nest or series, are circular frustum-shaped shells or webs D D'' D and R R, all provided with teeth on their peripheries, and D D'' D constructed to form electromagnets.

Receiving a bearing in suitable brackets on the standards A' A' are vertical shafts C C', provided at their upper ends with bevel-gears $c\ c'$, which mesh with the gears $c''\ c^3$, having a corresponding number of teeth and secured on the transverse shaft B. Gears of suitable size, $d''$, are secured to the vertical shafts C C' and mesh with the teeth $d$ of the circular web-shells D, and gears $d'$ mesh with the teeth $r$ of the circular web-shells R, each of the plates R R being supplied with an even number of spools $h$ for holding one set of threads $h'$, and their trunnions receive a bearing in vertically-slotted upright integral ears $r^4$ of the said shells.

Resting loosely between and conforming to the disk-shaped recesses or depressions $d^5$ are shuttles $g$, in which are wound the threads $g'$ of the shells D, and each of the said shells is constructed with a circumferential groove $d^6$, that is wound with wire $k$ in such a manner that, by means of being traversed with an electric current, will convert the said shells D into strong electromagnets at predetermined intervals when the machine is in operation.

The intermediate or double-faced shell D'' is constructed with a circumferential groove $d^6$ upon both its upper and lower faces.

Secured to the under sides of the magnetic shells D D'' D, diametrically opposed, are contact-plates $l$, insulated from the said shells and connected to the winding-wire $k$ by means of the wire $k'$.

Projecting from suitable metallic plates $m$, insulated and secured to the standards A A' A A', are flexible brushes or current-conducting springs $n$, that bear against the under side of the contact-plates $l$ their entire length, the plates $m$ being electrically connected in circuit by means of the wires $o$ with the source of electrical supply G. Guides $r^3$, formed by integral vertical projections, serve to direct the threads $h'$ from the spools $h$. Depressions or recesses $d^7$ are formed in the face of the inner rim of the magnetic shells D, through which to pass the shuttles $g$ to and from their seats $d^5$ when desirable.

The shuttles $g$, magnetically operated upon in the machine, are constructed with a circumferential spring $q$, that loosely fits within the edges of the convex sides and forms the guide for the thread $g'$ of each shuttle, and to this spring is attached an auxiliary spring $t$, that bears against the unused thread and forms the tension for it. A drag-wheel $s$ on the shaft B' removes the woven tube $v$ or covered wire $w$ as fast as manufactured, its speed to be regulated by the gears $b'\ b''$, as shown, or the use of intermediate gears that will suit the speed and character of manufacture.

In the operation of the machine power is applied to the shaft B in any well-known manner, which is communicated by means of the bevel-gears to the vertical shafts C C', which in turn by means of the gears meshing with the toothed shells rotates the latter, the shells marked D revolving in one direction and those marked R in a directly opposite one. The threads $g'$ coming from the magnetically-affected shuttle lying loosely between the magnetic shells are directed to the center and those threads $h'$ coming from the horizontal bobbins are first directed to the guides and thence to the center also.

In the course of the revolution of the electromagnetic shells at diametrically radial points the brushes or springs $n$ engage the contact-plates $l$, carried by the magnetic shells, thus closing the circuit through the plates $m$ on the standards, as described, and will magnetically charge said shell and cause the latter to instantly attract the shuttles $g$, first up, then down, away from the opposite plate, while the threads from the horizontal bobbins $h$ will pass over or under the threads from the shuttles $g$, according as the shuttle is held up or down by the attraction of the electromagnets $k$, carried by the shells D D''.

The number of shuttles resting upon their sides in the depressions in the electromagnetic shells directly central with the wire windings correspond in number to the horizontal bobbins carried by the non-magnetic shells, so that while the threads from the horizontal bobbins pass under the threads of the vertical shuttles at one instant the following instant the same threads will pass over. It is simply necessary to increase the number of magnetic and non-magnetic shells in the ratio shown in the nest to be able to place any number of plaits or braids in the weave.

Having thus described my invention, I claim the following:

1. In a braiding-machine, the combination with a suitable frame, of a series of oppositely-revoluble shells mounted therein, means for driving said shells, a set of bobbins mounted on each alternate shell of said revoluble series, a series of shuttles carried by the other shells of said series and coöperating with said bobbins, and electromagnets for controlling the position of said shuttles.

2. In a braiding-machine, the combination with a suitable frame, of a set of bobbins and shuttles operatively mounted in said frame, mechanism for driving said bobbins and shuttles, electromagnets arranged in proximity to the said shuttles, and means for energizing said magnets at predetermined intervals to control the position of said shuttles.

3. In a braiding-machine, the combination with a suitable frame, of a series of oppositely-revoluble shells mounted therein, means for driving said shells, a set of bobbins mounted on each alternate shell of said series, a series of shuttles carried in pockets between said shells, electromagnets carried by said shells and arranged in close proximity to said shuttles, a source of electrical energy, and connections between said source of electrical energy and said electromagnets to energize the latter at predetermined intervals and cause them to attract the shuttles.

4. In a braiding-machine, the combination with a suitable frame, of a series of oppositely-revoluble shells mounted therein, means for driving said shells, a set of bobbins carried by each alternate shell, a series of shuttles supported between the other shells and driven thereby, electromagnets carried by said last-named shells in proximity to the path of said shuttles, and means for energizing said magnets at predetermined intervals so as that they will attract said shuttles.

5. In a braiding-machine, the combination with a suitable frame, of a series of open-centered bobbin-carrying shells mounted therein, a series of frusto-conical-shaped shuttle-carrying shells nested in alternate series with said first-named shells, means for driving the two series in opposite directions, electromagnets mounted on said shuttle-carrying shells, and means for intermittently energizing said electromagnets to attract said shuttles and determine their positions at predetermined intervals.

6. In a braiding-machine, the combination with a suitable frame, of a series of oppositely-revoluble toothed shells nested together and supported by said frame, gear-wheels meshing with and driving said toothed shells, horizontally-placed bobbins mounted on each alternate shell, shuttles carried in suitable pockets formed in the other shells of said series, electromagnets placed in proximity to said shuttles on either side thereof, contact-plates carried by said revoluble shuttle-carrying shells, brushes carried by the frame which complete the circuit with said magnets through said contact-plates, and a source of electrical energy for exciting said magnets.

7. In a braiding-machine, the combination with a suitable frame, of a series of frusto-conical-shaped shells nested together and supported by said frame, a set of bobbins mounted on each alternate shell, a series of shuttles carried between the other shells of the series in pockets in which said shuttles have a slight vertical movement, circular depressions formed in each of the shuttle-carrying shells to receive magnetic coils, said magnetic coils and said shuttle-carrying shells forming electromagnets, said magnets being so arranged as that the shuttles lie within their field of attraction, and means for energizing said magnets so as to cause them to raise or depress the shuttles in their pockets at certain points in the travel of the shells.

8. In a braiding-machine, the combination with a suitable frame, of circular series of bobbins operatively mounted on said frame, circular series of shuttles lying within the circle of said bobbins and coöperating therewith, and means for raising and depressing the said shuttles alternately as they pass the bobbin-threads.

9. In a braiding-machine, the combination with a suitable frame, of circular series of bobbins operatively mounted on said frame, circular series of shuttles lying within the circle of said bobbins and coöperating therewith, and an electromagnet and means to excite said magnet at predetermined intervals so as to raise the shuttles as they pass each alternate bobbin-thread.

10. In a braiding-machine, the combination with a suitable frame, of circular series of bobbins operatively mounted on said frame, circular series of shuttles lying within the circle of said bobbins and coöperating therewith, and electromagnets on either side of said shuttles, said electromagnets being excited alternately to raise and depress the shuttles as they pass the bobbin-threads.

11. In a braiding-machine, the combination with a suitable frame provided with inwardly-projecting supports, of a series of circular shells revolubly mounted on said supports, horizontal bobbins mounted tangentially on each alternate shell, guides to carry the threads from said bobbins to the center of said circular shells, a series of shuttles carried in pockets in the remaining shells, electromagnets to raise and depress said shuttles, means for driving said bobbin-carrying shells in one direction and said shuttle-carrying shells in an opposite direction, contact-plates carried by said revoluble shells, stationary brushes mounted on said frame in the path of said contact-plates, and a source of electrical energy with which said brushes are in circuit so as that said electromagnets are energized and the shuttles are attracted at the moment of contact between said brushes and said traveling contact-plates.

12. In a braiding-machine, the combination with the frame A having the projections $a$, of the circular shells R provided with the integral supporting-lugs $r^4$, bobbins $h$ mounted in said lugs, guides $r^3$ for the bobbin-threads, the shells D, D'', nested with said shells R and provided with shuttle-pockets, shuttles $g$ mounted therein, electric-current conductors $k$ to magnetize shells D to control said shuttles, and means for driving said shells R and D, D'', in opposite directions.

13. In a braiding-machine, the combination with the frame A provided with inwardly-projecting lugs $a$, of the open-centered shells R revolubly mounted on said lugs and provided with teeth on their peripheries, the toothed shells D, D'', revolubly supported by said lugs $a$ in alternate series with shells R, said shells D, D'', being provided with pockets $d^5$ for the shuttles $g$ and circular depressions $d^6$ for electric-current conductors $k$ to magnetize shells D, gear-wheels $d'$ meshing with said toothed shells R and D, D'', a main shaft B, and connections between said main shaft and gear-wheels $d'$ whereby the latter drive the shells R and D, D'', in opposite directions.

14. A shuttle for braiding-machines comprising two plates, a post for supporting the cop uniting said plates at their centers, and a separate encircling ring held between the edges of said plates.

15. A shuttle for braiding-machines comprising two circular plates, a cop-supporting post uniting said plates at their centers, and a circumferential spring-ring encircling the edges of said plates.

16. A shuttle for braiding-machines comprising two concavo-convex plates, a central cop-supporting post uniting said plates, and a spring-ring encircling the edges of said plates, said ring being provided with a yarn-guiding aperture.

17. A shuttle for braiding-machines comprising two concavo-convex plates, a central cop-supporting post uniting said plates, a spring-ring encircling the edges of said plates, said ring being provided with a yarn-guiding aperture, and a tension-spring for the cop carried by said spring-ring.

18. A shuttle for braiding-machines comprising two circular concavo-convex plates, a cop-supporting post on which said plates are mounted so as that they are slightly separated at their edges, and a circumferential spring-ring held between the edges of said plates.

In testimony whereof I affix my signature in presence of two witnesses.

ALPHEUS C. SHUTTLEWORTH.

Witnesses:
LEWIS F. BROUS,
H. W. SHUTTLEWORTH.